United States Patent Office 2,736,306
Patented Feb. 28, 1956

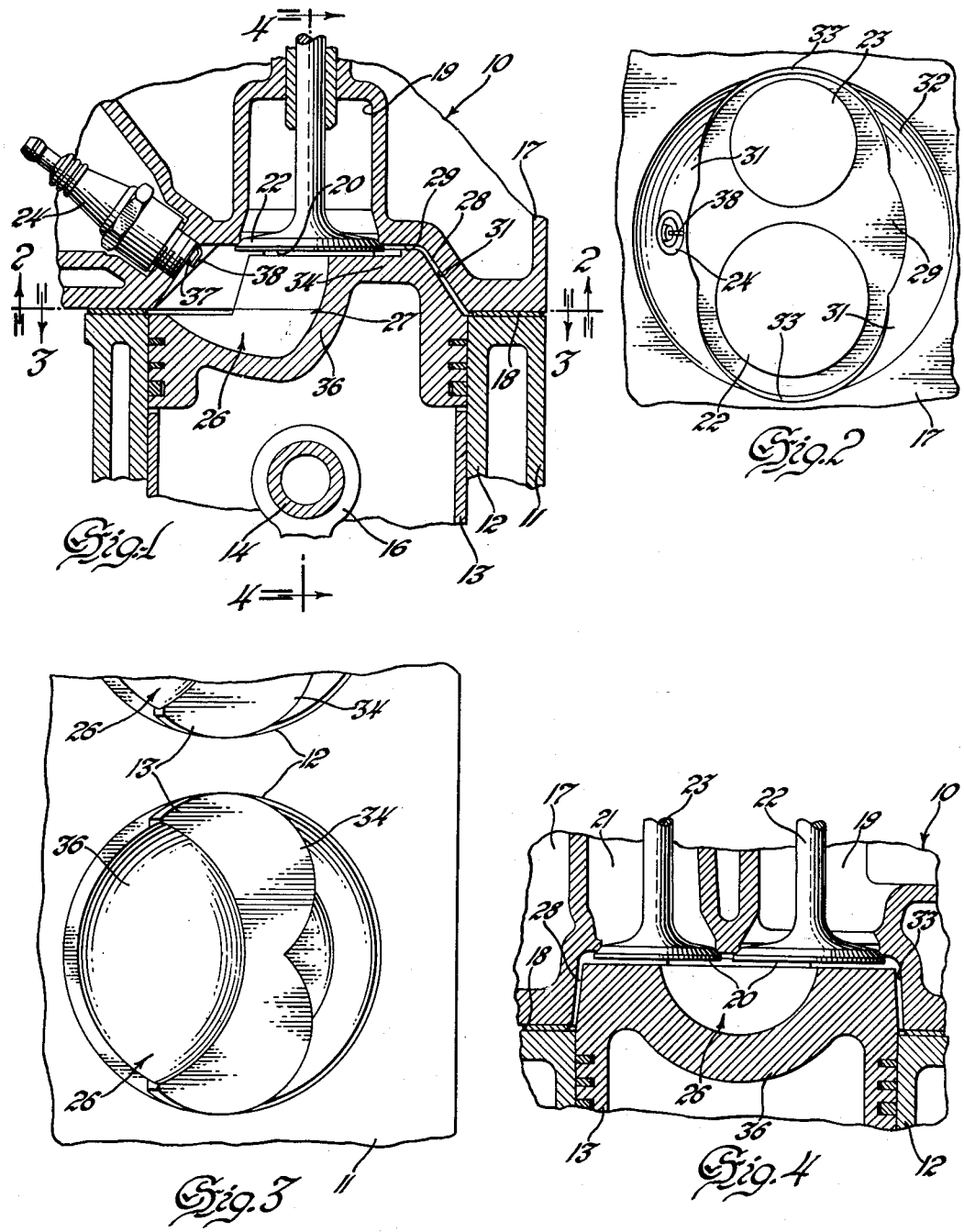

2,736,306

COMBUSTION CHAMBER

Archie D. McDuffie, Berkley, Mich., assignor to General Motors Corporation, Detroit, Mich., a corporation of Delaware Application October 8, 1952, Serial No. 313,679

10 Claims. (Cl. 123—191)

This invention relates to internal combustion engines and has particular relation to combustion chambers suitable for employment in four-stroke cycle spark-ignited internal combustion engines capable of operation at relatively high compression ratios on commercial hydrocarbon fuels.

In designing engines for automotive and other purposes it has been found to be advantageous to locate the valves in the head of the engine in directly opposed relation to the end of the cylinders of the engine. When this is done it is possible to obtain good induction and exhaust to and from the cylinders of the engine and there are many manufacturing and other advantages that result from this design. However, it is difficult to design combustion chambers for such engines which are capable of operation at high compression ratios, without detonation and preignition and in which the compression ratio may be changed from time to time without excessive tooling and other costs.

In order to provide a high compression ratio valve-in-head engine which will not be subject to these difficulties it is proposed to locate the valves in the head of the engine with the axes of the valves substantially in a plane coincident with the axes of an aligned group of cylinders of an engine. It is further proposed to provide a combustion chamber for each cylinder consisting of a compact firing chamber and a minimum mechanical clearance space between the end of the piston and the head of the cylinder. In order to provide room for locating the firing chamber it is proposed to place the normally disposed inner end surfaces of the valves a substantial distance beyond the end of the cylinder. One side of the end of the piston may project into the head in closely spaced relation to the surfaces of the valves and the head to thereby provide a minimum mechanical clearance space. On the opposite side of the cylinder and the valves it is proposed to form a relatively spherically shaped depression in the end of the piston to thereby provide a firing chamber for each cylinder that is compact in design and one edge of which is in communication with the mechanical clearance space for the cylinder. The spark plug may be located in each cylinder in directly opposed relation to each of the firing chambers and with the spark gap between the ignition terminals of the spark plug substantially equidistant from all of the remote surfaces of the firing chamber. It will be apparent that the greater part of the charge in the compression chamber of each cylinder may be burned in the firing chamber before detonation occurs and that the remaining part of the charge which is compressed into the clearance space on the opposite side of the cylinder may thereafter burn without detonation at a relatively reduced rate.

In the drawings:

Figure 1 is a fragmentary vertical sectional view through an engine having combustion chambers embracing the principles of the invention.

Figure 2 is a fragmentary view of the head of the engine looking upwardly from the plane of line 2—2 on Figure 1.

Figure 3 is another fragmentary view of the engine shown by Figure 1 and looking downwardly at the engine block from the plane of line 3—3 on Figure 1.

Figure 4 is a fragmentary longitudinal sectional view taken substantially in the plane of line 4—4 on Figure 1, of one of the cylinders of the engine.

The engine 10 comprises an engine block 11 in which aligned cylinders 12 may be formed. The cylinders 12 contain reciprocal pistons 13 having piston pins 14 adapted to be connected by connecting rods 16 to the crankshaft of the engine. The upper ends of the cylinders 12 are closed by an engine head 17 which is adapted to be secured to the block 11 by bolts or other suitable means not shown. An engine gasket 18 is secured between the adjacent surfaces of the head 17 and block 11. The head 17 is formed to provide inlet passages 19 and exhaust passages 21 for supplying a combustible mixture to and exhausting the products of combustion from the cylinders 12. The ports formed at the inner extremities of the passages 19 and 21 are closed respectively by inlet valves 22 and exhaust valves 23. The stems of the inlet and exhaust valves may be aligned lengthwise of the block 11 and may be disposed in a plane also containing the axes of the cylinders 12. The inner surfaces 20 of the valves 22 and 23 may extend in the same plane when the valves are closed and are disposed normally with respect to the axes of the valve stems and of the cylinders 12. The inner surfaces 20 of the valves 22 and 23 also are positioned in the head 17 in spaced relation to the upper ends of the cylinders 12. The cylinders 12 also are provided with spark plugs 24 which are secured in aligned openings formed in the head 17 and in positions at one side of and approximately between the inlet and exhaust valves 22 and 23 for each of the cylinders 12.

Each cylinder of the engine is provided with a combustion chamber 26 which is formed between the adjacent surfaces of the piston 13, the head 17, the valves 22 and 23, the spark plug 24 and the inner edges of the gasket 18. Each combustion chamber 26 is formed in such a way as to provide a firing chamber 27 at one side of the cylinders 12 and a clearance space 28 at the opposite side of the cylinders 12.

In order to provide space for forming the firing chambers 27 and the clearance spaces 28 the inner surface of the head 17 is formed to provide elongated planular surfaces 29 and convex tapering surfaces 31 which extend between the upper ends of the cylinders 12 and the edges of the surfaces 29. The surfaces 29 provide clearance around and between the valves 22 and 23 to permit the relatively unobstructed flow of fluid to and from the inlet and exhaust ports which the valves 22 and 23 are adapted to open and close. The valves 22 and 23 extend substantially entirely and diametrically across each of the cylinders 12 and across the elongated planular surfaces 29. The surfaces 31 which extend between the ends of the cylinders 12 and the edges of the elongated surfaces 29 may have only a very slight slope at the ends of the valves 22 and 23 whereas the surfaces slope to a considerably greater extent on the opposite sides of the valves 22 and 23. If this is considered desirable the surfaces 31 each may be formed by the intersection of two surfaces of revolution, one being a conical surface indicated at 32 and having the axis thereof upon the axis of the cylinder 12, the other being a slightly sloping surface indicated at 33 which is formed about an axis which moves across the cylinder upon a line extending between the axes of the stems of the inlet and exhaust valves 22 and 23. The ends of the spark plugs 24 are adapted to project through the surfaces 31 at one side of the cylinder and at one side of and between the valves 22 and 23.

The wall 34 which forms the end of each of the pistons 13 is adapted to project beyond the cylinder 12 at the side of the cylinder opposite the spark plug 24 and at one side of the valves 22 and 23. The end surfaces of the pistons that so project beyond the ends of the cylinders are adapted to terminate in closely and substantially uniformly spaced relation to the adjacent surfaces of the head and the valves. The complementary walls forming each of the clearance spaces 28 between the piston, the head and the valves provide a quench area for each of the combustion chambers 26. The depth of the clearance spaces 28 may be small enough so that the rate of flame travel will be considerably decreased by absorption of heat by the relatively cold walls of the valves, the head and the piston when the piston is at or near top dead center. The firing chamber 27 in each cylinder is formed on the side of the piston adjacent the spark plug 24 and in directly opposed relation to the clearance space 28. The firing chamber 27 in each cylinder is formed by depressing the wall 34 forming the end of the piston 13 on the side of the cylinder and valves opposite the clearance space 28. The walls 34 may be depressed in any manner to provide a relatively compact firing chamber adjacent the spark gap 37 between the ignition terminals 38 of the spark plugs 24. It is preferred to form the firing chamber 27 to provide a wall 36 in directly opposed relation to the spark plug 24. All parts of the substantially spherical surface of the wall 36 are substantially equidistant from the spark gap between the terminals of the spark plug 24.

With the firing chamber 27 positioned and located in this manner it will be apparent that the greater part of the charge in the combustion chamber 26 will be located in a compact chamber adjacent the spark plug terminals. When the charge is ignited by the spark across the ignition terminals of the spark plug 24 the greater part of the charge in the firing chamber 27 will be so near the spark plug that this part of the charge may be made to burn before detonation has time to occur. The remaining and more dense part of the charge which is compressed into the clearance space 28 thereafter may be made to burn from the edge of the firing chamber toward the opposite side of the cylinder. However, due to the large cold wall surface to volume ratio in the clearance space 28 the rate of flame propagation may be so decreased in the clearance space 28 that the charge will also burn in the clearance space 28 before detonation has time to occur. With combustion chambers formed in this manner hydrocarbon fuels having relatively low octane values may be employed in engines in which the compression ratio is relatively high.

I claim:

1. An engine comprising a cylinder having a pair of inlet and exhaust valves in the head of said cylinder, said valves being mounted with the end surfaces thereof extending normally to the axis and spaced beyond the end of said cylinder, said head beyond said end of said cylinder being formed to provide connecting walls sloping toward and extending to the edges of said valves throughout the peripheral extent of said end of said cylinder, a piston disposed in said cylinder and having an end wall adapted to project into said head, said end wall being complementary to the surfaces of said head and said valves and extending diametrically across said cylinder and throughout the greater part of the end of said piston, a spark plug disposed in said head and projecting through one of said connecting walls at the side of said cylinder and said valves, and a combustion chamber formed between said head and said piston walls and said valves and including a firing chamber extending into said piston end wall at the side of said cylinder adjacent said spark plug and including a clearance space extending between said head and piston walls and said valves on the side of said cylinder opposite said spark plug and said firing chamber.

2. An engine as defined by claim 1 and in which said clearance space between said valves and said head and piston walls is a minimum mechanical clearance space of relatively small and substantially uniform depth.

3. An engine as defined by claim 1 and in which the greater part of the charge to be ignited in said cylinder is adapted to be compressed into said firing chamber and to be ignited in said firing chamber before the lesser part of said charge compressed in said clearance space is ignited.

4. An engine as defined by claim 1 and in which said inlet and exhaust valves extend diametrically across said cylinder beyond the end of said cylinder and in which said connecting walls of said head on opposite sides of said valves are formed in part by conical surfaces of revolution formed about the axis of said cylinder and having the larger ends thereof substantially coinciding with the end of said cylinder.

5. An engine as defined by claim 1 and in which a part of the end wall of said piston forming the part of said firing chamber which is most remote from said spark plug, is substantially a spherical surface of revolution formed about the gap between the ignition terminals of said spark plug.

6. An engine comprising a cylinder having a pair of inlet and exhaust valves in the head of said cylinder, said valves being mounted in said head with the axes thereof in parallel relation to the axis of said cylinder and with the inner normally disposed surfaces thereof in substantially the same plane and extending normally to the axis and in spaced relation to the end of said cylinder, said head being formed to provide an elongated surface surrounding said valves and extending outwardly from the edges of and between said valves, said head also being formed to provide an inwardly sloping connecting surface extending between the end of said cylinder and the edges of said elongated surface, a piston in said cylinder and having an end formed to provide surfaces complementary to the oppositely disposed elongated and connecting surfaces of said head and the normally disposed surfaces of said valves and extending diametrically across said cylinder and throughout the greater part of the end of said piston, said complementary surfaces being substantially equally spaced from said oppositely disposed surfaces to provide a clearance space of relatively uniform depth and forming a part of the combustion chamber of said engine, said piston end on the opposite side of said cylinder and said valves being depressed to provide a firing chamber forming another part of said combustion chamber in open communication with a peripheral edge of said clearance space, and a spark plug secured in said head at one side of said valves and with the ignition terminals thereof extending through said connecting surface in directly opposed relation to said firing chamber.

7. An engine as defined by claim 6 and in which said elongated surface surrounding said valves extends across said cylinder to provide an area of a length substantially equal to the diameter of said cylinder.

8. An engine as defined by claim 6 and in which the relatively uniformly spaced walls of said clearance space extending from said firing chamber forms a quench area in which the last part of the charge ignited in said combustion chamber is burned.

9. An engine as defined by claim 6 and in which the part of the end of said piston forming said firing chamber includes a surface directly opposed to said spark plug and substantially all parts of which are equally distant from the spark gap between the ignition terminals of said spark plug.

10. An engine as defined by claim 6 and in which said firing chamber forms a relatively large and compact part of said combustion chamber and into which the ignition terminals of said spark plug project and in which said clearance space forms a relatively small part of said combustion chamber extending beyond said firing chamber from a remote edge of said firing chamber.

References Cited in the file of this patent

UNITED STATES PATENTS

| | | |
|---|---|---|
| 2,214,941 | Taub | Sept. 17, 1940 |
| 2,324,705 | Huber | July 20, 1943 |
| 2,428,886 | McPherson | Oct. 14, 1947 |

FOREIGN PATENTS

| | | |
|---|---|---|
| 101,721 | Sweden | June 3, 1941 |